United States Patent [19]

Lenne et al.

[11] 4,161,060

[45] Jul. 17, 1979

[54] PROCESS FOR THE PRODUCTION OF A MOULD FOR MOULDING A SPECTACLE FRAME FRONT

[75] Inventors: William Lenne, Gagny; Jean F. Bourdot, Paris; Guy Rolland, Vincennes, all of France

[73] Assignee: Essilor International (Cie Generale d'Optique), Joinville le Pont, France

[21] Appl. No.: 856,581

[22] Filed: Dec. 1, 1977

[30] Foreign Application Priority Data

Dec. 17, 1976 [FR] France .................................. 76 38040

[51] Int. Cl.² ................... B22D 11/126; B21D 33/00; B29C 1/02; B29N 9/00
[52] U.S. Cl. .................................. 29/527.1; 29/527.6; 29/20; 264/273; 264/274; 249/95; 425/127; 425/129 R; 264/219; 264/220; 264/226; 264/271; 264/275
[58] Field of Search ............. 29/530, 20, 527.4, 527.1, 29/527.2, 527.3, 527.6; 249/95; 425/127, 129; 264/273, 274, 279, 219, 220, 226, 1, 271, 275

[56] References Cited

U.S. PATENT DOCUMENTS

| 1,461,071 | 7/1923 | Schumacher | 29/20 X |
| 3,406,232 | 10/1968 | Barker | 264/274 |

*Primary Examiner*—C. W. Lanham
*Assistant Examiner*—V. K. Rising
*Attorney, Agent, or Firm*—Charles E. Brown

[57] ABSTRACT

Two metallic half-moulds are produced from a prototype. The half-moulds have complementary mould faces which abut when the mould is closed, and moulding surfaces formed with annular rim depressions joined by a bridge cavity, each rim depression bordering a support surface for a false lens. A webbed frame front is moulded, false lenses are cut from that moulded front, and the mould faces which abut are set-back by a total amount corresponding to the shrinkage of the false lenses, so that the false lenses are gripped between the support surfaces and shape lens bezels in the rims when a frame front is moulded.

5 Claims, 9 Drawing Figures

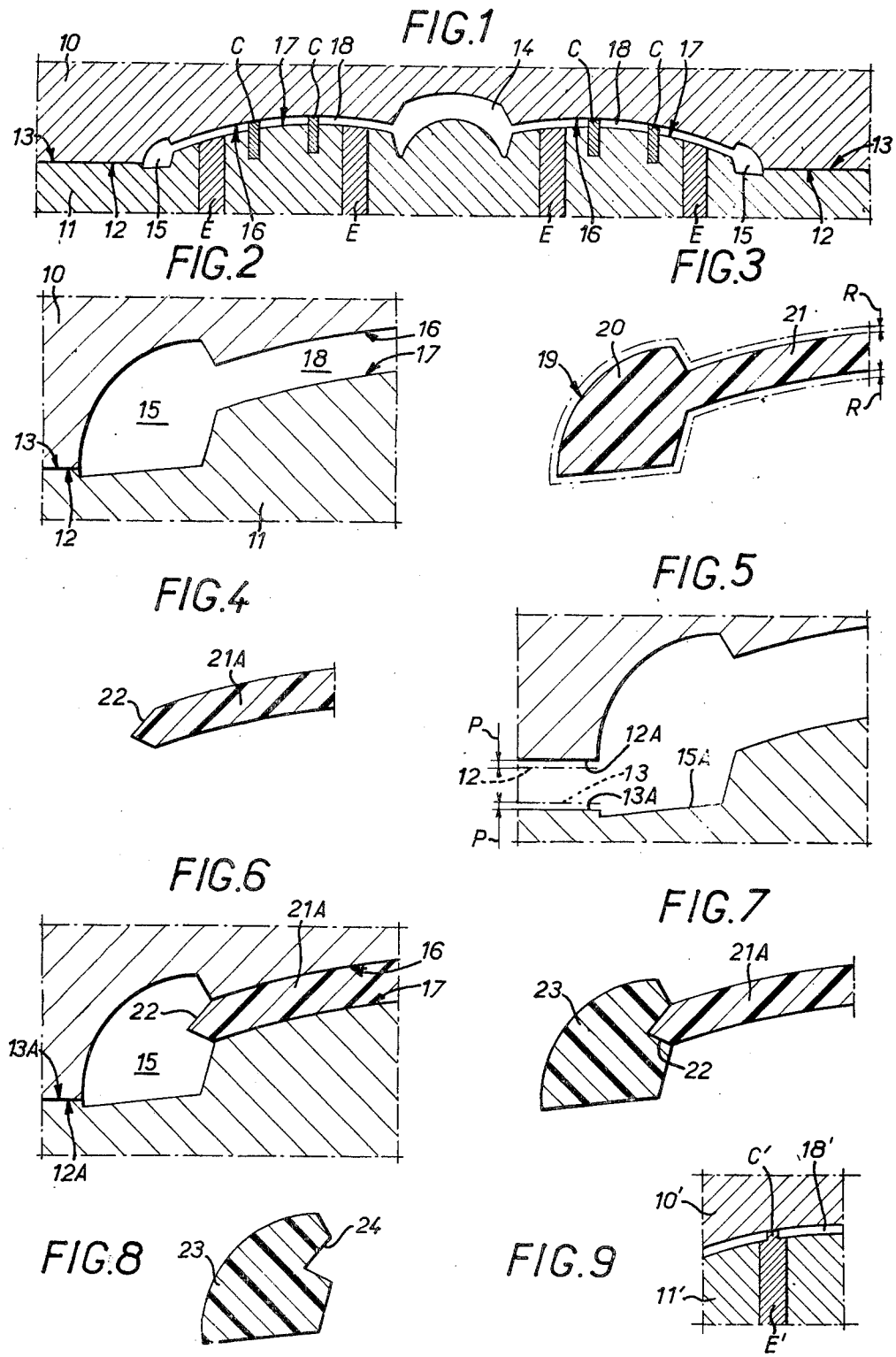

PROCESS FOR THE PRODUCTION OF A MOULD FOR MOULDING A SPECTACLE FRAME FRONT

BACKGROUND OF THE INVENTION

This invention relates to a process for the production of a mould for moulding a spectacle frame front.

A spectacle frame usually consists of a front and two articulated side pieces. The front comprises two rims joined by a bridge. Each rim has an annular groove, known as a bezel, for mounting a lens.

A known process for producing a mould for the moulding of a spectacle frame front, from a prototype pattern, comprises producing from a prototype two metal half-moulds having complementary mould faces which abut when the mould is closed. Each half-mould has a moulding surface formed with a bridge cavity, two annular rim depressions one on each side of the bridge cavity, and support surfaces bounded by the rim depressions for supporting false lenses.

Known processes of this kind include expensive machining operations, which increases the cost price.

It is a main object of the present invention to provide a process for the production of moulds for moulding spectacle frame fronts which does not have this disadvantage and the application of which is convenient and inexpensive.

SUMMARY

In the present invention the half-moulds are employed, in a first phase, for moulding at least one webbed frame front. A pair of false lenses are cut out of the webbed frame front, and the abutting mould faces are then set-back, in a second phase, by a total depth at least equal to the moulding shrinkage of the false lenses so that the false lenses can be gripped between the support surfaces when the mould faces abut.

The false lenses cut from the webbed spectacle front are thus used as a core between the two half-moulds, and the periphery of each false lens projects into the rim depressions to mould the bezels.

Because the abutting mould faces are set back to a total depth at least equal to the moulding shrinkage of the false lenses, each false lens is satisfactorily gripped and accurately positioned between the support surfaces formed on the half-moulds.

It then remains to inject material into the rim depressions. The false lenses are removed leaving formed in each rim the bezel for the mounting of a lens.

The false lenses are recovered after each moulding operation and can be reused a certain number of times. In the first phase of forming webbed frames it is advisable to make a number of such frames so as to be able to make a number of pairs of false lenses which are then used for producing the desired series of frames until the false lenses are worn out.

The setting-back of the mould faces is effected once and for all, because the moulding shrinkage of the false lenses is always the same.

This setting-back is preferably effected by electroerosion, particularly when the half-moulds are made of an electro-erodable metal or alloy, for example cuproberylium.

BRIEF DESCRIPTION OF THE DRAWINGS

One embodiment of the invention is described below, by way of example, with reference to the accompanying drawings, in which:

FIG. 1 shows in section two half-moulds obtained from a prototype pattern, with the complementary mould surfaces in contact, for the purpose of forming webbed frames;

FIG. 2 is a partial view on a larger scale of the two half-moulds in FIG. 1;

FIG. 3 is a partial corresponding view in section of a webbed frame obtained by injection of material into the half-moulds shown in FIG. 2, and shows moulding shrinkage;

FIG. 4 is a view similar to FIG. 3, but showing a false lens cut from the webbed frame of FIG. 3;

FIG. 5 shows the two half-moulds moved apart and illustrates the setting-back of the complementary mould faces in order to take into account the moulding shrinkage shown in FIG. 3;

FIG. 6 shows the half-moulds with the complementary mould faces abutting against each other after they have been set back, and with the two half-moulds gripping a false lens between them;

FIG. 7 is a view in section of the assembly comprising a moulded rim and the false lens;

FIG. 8 is a view similar to FIG. 7 but shows only the rim after removal of the false lens; and FIG. 9 relates to a modification of the half-moulds.

DESCRIPTION OF THE PREFERRED EMBODIMENT

In the embodiment shown in FIGS. 1 to 8 two half-moulds 10 and 11 are made of metal, particularly of an electro-erodable metal or alloy, from a prototype pattern. The half-moulds 10 and 11 have complementary abutting mould faces 12 and 13 respectively.

The moulding surface of each of the half-moulds 10 and 11 is formed with a bridge cavity 14, and with two annular rim depressions 15 one on each side of the bridge cavity 14. Each annular depression 15 borders a spherical support surface, namely a support surface 16 on the half-mould 10 and a support surface 17 on the half-mould 11. The surfaces 16 and 17 are spaced apart by a constant gap 18, and constitute supports for false lenses 21.

Centering studs C are provided for the positioning of the false lenses 21. The studs C are placed in the mould before injection. Ejectors E are also provided to eject the moulded frames. The ejectors are supported against the false lenses 21.

The half-moulds 10 and 11 formed in this manner are used for moulding a series of webbed frame fronts.

With the mould closed a plastics material, for example polyamide, is injected into all the spaces 14, 15, and 18, and one or preferably a number of webbed frames 19 are produced. Each webbed frame has two rims 20 filled with webs of material constituting the false lenses 21. Each webbed frame has a moulding shrinkage R which is shown in FIG. 3.

From each of the webbed frame fronts 19 thus obtained, a pair of false lenses 21A are cut out, with the periphery 22 of the lenses cut with double-bevels so that they project into the annular depressions 15 to shape the bezels in the moulded rims 20.

The mould faces 12 and 13, and no other parts, are then set back once and for all to a total depth P at least equal to the moulding shrinkage R. The face 12 is thus set back at 12A while the face 13 is set back at 13A.

This setting-back of the faces 12 and 13 at 12A and 13A respectively is advantageously effected by electroerosion of the surfaces 12 and 13 which are of electro-erodable metal or alloy, for example cuproberylium or KAYEM, a zinc and lead based alloy. This treatment by electro-erosion is not extended to the depressions 15, the surfaces 16 and 17, or the bridge cavity 14.

The false lenses 21A are placed on the support surfaces 16 and 17 and the mould is closed with the faces 12A and 13A are abutting against each other. This has the effect of gripping the false lenses 21A between the surfaces 16 and 17, with accurate positioning. The double-bevelled peripheries 22 of the lenses project into the depressions 15.

The plastics material for the formation of the frame front is then injected. When removed from the mould, this frame front 23 carries the false lenses 21A, whose peripheries 22 project into the rims. The false lenses 21A are then removed, leaving the frame front 23 with annular grooves 24 corresponding to the double-bevelled peripheries 22 and constituting the bezels for fitting of lenses.

The false lenses 21A, of which as large a number as necessary will be produced, can be used a number of times for the production of the desired series of frame fronts.

The convenience and inexpensive nature of the process of the invention will be appreciated.

In a modified embodiment (FIG. 9) the arrangement is similar to that described above with reference to FIGS. 1 to 8, but the centring studs C' and the ejectors E' constitute a single part. The centring studs C' are formed by the top of those parts. The diameter of the studs C' is smaller than the diameter of the ejectors E'.

In FIG. 9 the half-moulds are indicated at 10' and 11' and the gap for the false lenses is indicated at 18'.

We claim:

1. A process for the production of a mould for moulding a spectacle frame front from a prototype pattern, comprising:

producing from a prototype two metallic half-moulds having complementary abutting mould faces, the moulding surface of each half mould being formed with a bridge cavity, two annular rim depressions one on each side of the bridge cavity and support surfaces bounded by the rim depressions for supporting false lenses;

employing the half-moulds, in a first phase, for moulding at least one webbed frame front;

cutting a pair of false lenses out of the webbed frame front; and setting back the abutting mould faces in a second phase by a total depth at least equal to the moulding shrinkage of the false lenses so that the false lenses can be gripped between the support surfaces when the mould faces abut.

2. A process according to claim 1, comprising forming a series of pairs of false lenses in said first phase.

3. A process according to claim 1, comprising setting-back the mould faces by electro-erosion.

4. A process according to claim 1, wherein the half-moulds are made of an electro-erodable metal or alloy.

5. A process according to claim 4, comprising setting-back the mould faces by electro-erosion.

* * * * *